(12) United States Patent
Subramanian et al.

(10) Patent No.: US 10,769,577 B2
(45) Date of Patent: Sep. 8, 2020

(54) ADAPTIVE LOGISTICS PLATFORM FOR DETERMINING DEMURRAGE AND DETENTION DATA

(71) Applicant: Accenture Global Solutions Limited, Dublin (IE)

(72) Inventors: Vijayanambi Subramanian, Chennai (IN); Hemant Kuvar, Pune (IN); Sivakumar Nair, Fremont, CA (US); Chandramouli Viswanathan, Chennai (IN); Manoj Kumar Mannotty, Chennai (IN)

(73) Assignee: Accenture Global Solutions Limited, Dublin (IE)

( * ) Notice: Subject to any disclaimer, the term of this patent is extended or adjusted under 35 U.S.C. 154(b) by 330 days.

(21) Appl. No.: 15/262,951

(22) Filed: Sep. 12, 2016

(65) Prior Publication Data

US 2018/0075408 A1 Mar. 15, 2018

(51) Int. Cl.
*G06Q 20/10* (2012.01)
*G06Q 10/08* (2012.01)

(52) U.S. Cl.
CPC ...... *G06Q 10/08345* (2013.01); *G06Q 10/08* (2013.01)

(58) Field of Classification Search
CPC .......................... G06Q 10/08345; G06Q 10/08
USPC ........................................................ 705/335
See application file for complete search history.

(56) References Cited

U.S. PATENT DOCUMENTS

| 6,463,419 B1 * | 10/2002 | Kluss ............... G06Q 10/08 705/330 |
| 8,437,948 B1 * | 5/2013 | Balasundaram ............................ G08G 1/096838 701/117 |
| 2003/0063111 A1 * | 4/2003 | Maclean ............... G06Q 10/00 715/700 |

(Continued)

OTHER PUBLICATIONS

J. C. Reynolds, R. P. Denaro and R. M. Kalafus, "GPS-based vessel position monitoring and display system," in IEEE Aerospace and Electronic Systems Magazine, vol. 5, No. 7, pp. 16-22, Jul. 1990, doi: 10.1109/62.134216. (Year: 1990).*

(Continued)

*Primary Examiner* — George Chen
*Assistant Examiner* — Wayne S. Murray
(74) *Attorney, Agent, or Firm* — Harrity & Harrity, LLP

(57) ABSTRACT

A device may receive event information identifying a container event associated with one or more shipping containers. The container event may indicate a time to be used to determine demurrage or detention data for the one or more shipping containers. The device may determine, based on the event information, baseline information associated with generating demurrage or detention data for the one or more shipping containers. The device may determine, based on the container event and the baseline information, that demurrage or detention has been triggered in association with the one or more shipping containers. The device may generate the demurrage or detention data for the one or more shipping containers using the baseline information and the event information, and based on determining that demurrage or detention has been triggered in association with the one or more shipping containers. The device may provide the demurrage or detention data.

20 Claims, 7 Drawing Sheets

(56) References Cited

U.S. PATENT DOCUMENTS

| | | | | |
|---|---|---|---|---|
| 2007/0120736 | A1* | 5/2007 | MacKenzie | G06Q 50/28 342/357.66 |
| 2007/0262861 | A1* | 11/2007 | Anderson | G06Q 10/025 340/539.13 |
| 2010/0149028 | A1* | 6/2010 | Mermet | G01S 5/0027 342/357.31 |
| 2013/0321211 | A1* | 12/2013 | Chakraborty | G06Q 10/087 342/451 |
| 2014/0129083 | A1* | 5/2014 | O'Connor Gibson | B60G 99/00 701/37 |
| 2016/0253642 | A1* | 9/2016 | Efird | G06Q 10/0835 705/34 |

OTHER PUBLICATIONS

Maersk Line, "Demurrage & Detention," http://www.maerskline.com/ar-qa/countries/us/world%20factbook/export/demurrage-detention, Nov. 29, 2014, 3 pages.

Maersk Line, "Demurrage & Detention," http://www.maerskline.com/ar-qa/countries/us/world%20factbook/import/demurrage-detention, Nov. 29, 2014, 4 pages.

CMA CGM, "Demurrage Detention—General Terms," https://www.cma-cgm.com/ebusiness/tariffs/demurrage-detention/general-terms, May 2, 2016, 2 pages.

Talleur, "Demurrage vs Detention," http://www.containerquote.com/demurrage-vs-detention, Aug. 27, 2012, 1 page.

Manaadiar, "Difference between Demurrage and Detention," http://shippingandfreightresource.com/difference-between-demurrage-and-detention/, Jul. 8, 2009, 7 pages.

* cited by examiner

ADAPTIVE LOGISTICS PLATFORM FOR DETERMINING DEMURRAGE AND DETENTION DATA

BACKGROUND

In the shipping industry, buyers (consignees) and sellers (consignors) often use a third party carrier to transport goods. The customers of the third party carrier, or shipping company, many include such buyers (consignees), sellers (consignors), and freight forwarders. Arrangements with these carriers may contain liquidated damage provisions that assign penalties to parties who are late to pick up or drop off containers of goods. These penalties may be referred to as demurrage and detention.

SUMMARY

According to some possible implementations, a device may receive event information identifying a container event associated with one or more shipping containers. The container event may indicate a time to be used to determine demurrage or detention data for the one or more shipping containers. The device may determine, based on the event information, baseline information associated with generating demurrage or detention data for the one or more shipping containers. The device may determine, based on the container event and the baseline information, that demurrage or detention has been triggered in association with the one or more shipping containers. The device may generate the demurrage or detention data for the one or more shipping containers using the baseline information and the event information, and based on determining that demurrage or detention has been triggered in association with the one or more shipping containers. The device may provide the demurrage or detention data.

According to some possible implementations, a method may include receiving, by a device, event information identifying a container event associated with generating demurrage or detention data for a shipping container. The method may include identifying, by the device and based on the event information, baseline information associated with generating the demurrage or detention data for the shipping container. The method may include determining, by the device and based on the container event and the baseline information, that generation of the demurrage or detention data is to be triggered in association with the shipping container. The method may include generating, by the device, the demurrage or detention data for the shipping container based on the event information and the baseline information, and based on determining that generation of the demurrage or detention data is to be triggered in association with the shipping container. The method may include providing, by the device, the demurrage or detention data.

According to some possible implementations, a non-transitory computer-readable medium may store one or more instructions that, when executed by one or more processors, cause the one or more processors to receive event information identifying a container event associated with generating demurrage or detention data for a shipping container. The container event may indicate a time to be used to generate the demurrage or detention data for the shipping container. The one or more instructions may cause the one or more processors to identify, based on the event information, baseline information associated with generating the demurrage or detention data for the shipping container. The one or more instructions may cause the one or more processors to determine, based on the event information and the baseline information, that generation of the demurrage or detention data is to be triggered in association with the shipping container. The one or more instructions may cause the one or more processors to generate the demurrage or detention data for the shipping container based on the event information and the baseline information, and based on determining that generation of the demurrage or detention data is to be triggered in association with the shipping container. The one or more instructions may cause the one or more processors to provide the demurrage or detention data.

DETAILED DESCRIPTION

Figure 1A:
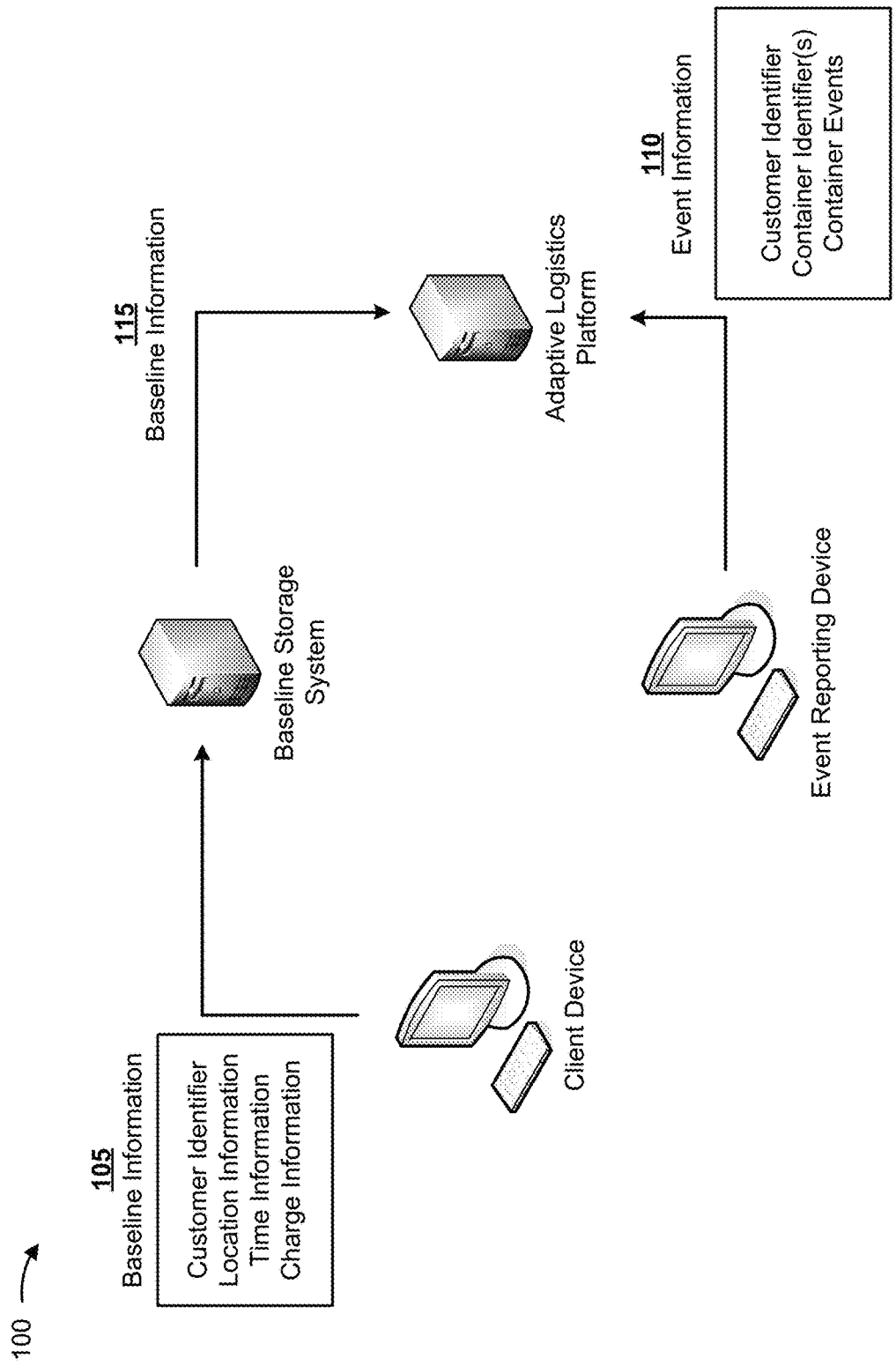
FIGS. 1A, 1B, and 1C are diagrams of an overview of an example implementation described herein.

The following detailed description of example implementations refers to the accompanying drawings. The same reference numbers in different drawings may identify the same or similar elements.

Shipping carriers often transport goods using a variety of different modes of travel (e.g., a cargo ship for water transportation, a plane for aerial transportation, a truck for land transportation, etc.). In each of these cases, contracts between a shipping carrier and a buyer and seller often include late fees for container pickup and container drop-off. While the implementations described below focus primarily on determining demurrage and/or detention data for water transportation, it is to be understood that implementations exist that apply to other modes of travel.

In some implementations, such as in water transportation, demurrage and/or detention data may involve events occurring in or around ports. At the shipping port, a seller may have a fixed time period to load a shipping container and complete all paperwork necessary to leave the port on time. At the receiving port, a buyer may have a fixed time period to pick up a shipping container of goods, as well as a fixed time period to drop off an empty shipping container. Failure to satisfy these deadlines may result in demurrage and/or detention data (e.g., charge information) as indicated in the contract.

Demurrage data may be determined for a buyer if a container of goods is not picked up within a threshold interval (e.g., a contracted time period, such as a contractual pickup time period). After the buyer picks up the container, detention data may be determined when the buyer fails to return the emptied container before a threshold interval (e.g., a contractual drop-off time period). Similarly, demurrage data may be determined for a seller if an empty container of goods is not picked up within a threshold interval (e.g., a pickup time period). After the seller picks up the container, detention data may be determined when a seller picks up an empty container for loading but fails to return the loaded container before a threshold interval (e.g., a drop-off time period). In addition to demurrage and/or detention relating to container pickup and drop-off, demurrage and/or detention data may be determined if a seller has returned a loaded container to the dock but the container cannot be shipped for some other reason (e.g., lack of documentation, an error in documentation, etc.).

As a result of an expanding global economy, shipping carriers have had an increasingly difficult time determining and using demurrage and/or detention data. Factors leading to this problem include an increase in port congestion (e.g., larger vessels that contain larger quantities of containers), a delay due to customs (e.g., a customs examination relating to type and weight of goods, a documentation check needed to get through customs, etc.), a processing delay by the shipping carrier (e.g., inventory checks to ensure goods are not lost and/or damaged), a strike by port employees (e.g., a labor strike at a departure port and/or an arrival port), a weather delay, and/or any other event that may delay a shipment of goods. Implementations described herein provide a shipping carrier with accurate, real-time determinations of demurrage and/or detention data using baseline information and event information. In addition, implementations described herein may utilize artificial intelligence models and/or natural language processing techniques to further improve determination of demurrage and/or detention data (e.g., through the use of predictive analytics, error checking, etc.).

In this way, the determination of demurrage and/or detention data may be improved by efficient and effective allocation of resources (e.g., computing resources or personnel). For example, a determination of demurrage and/or detention data may be made by utilizing a system that conserves network resources by sending less data because the system may need to request only a portion of the baseline information to determine the data. Furthermore, the system may conserve memory resources by storing baseline information on a separate server. Here, the system may conserve processing resources because baseline information does not have to be retrieved from a local database. In addition, the accuracy of demurrage and/or detention determinations may be improved through the use of artificial intelligence models and/or natural language processing techniques. This may preserve real-time (e.g., relative to a customer shipping request) computing resources by using predictive analytics to improve the efficiency of each real-time request. Here, overall performance and/or operation of the system may be improved due to the efficient and/or effective allocation of such resources, thereby allowing the system to function more efficiently and/or effectively.

Figure 1B:
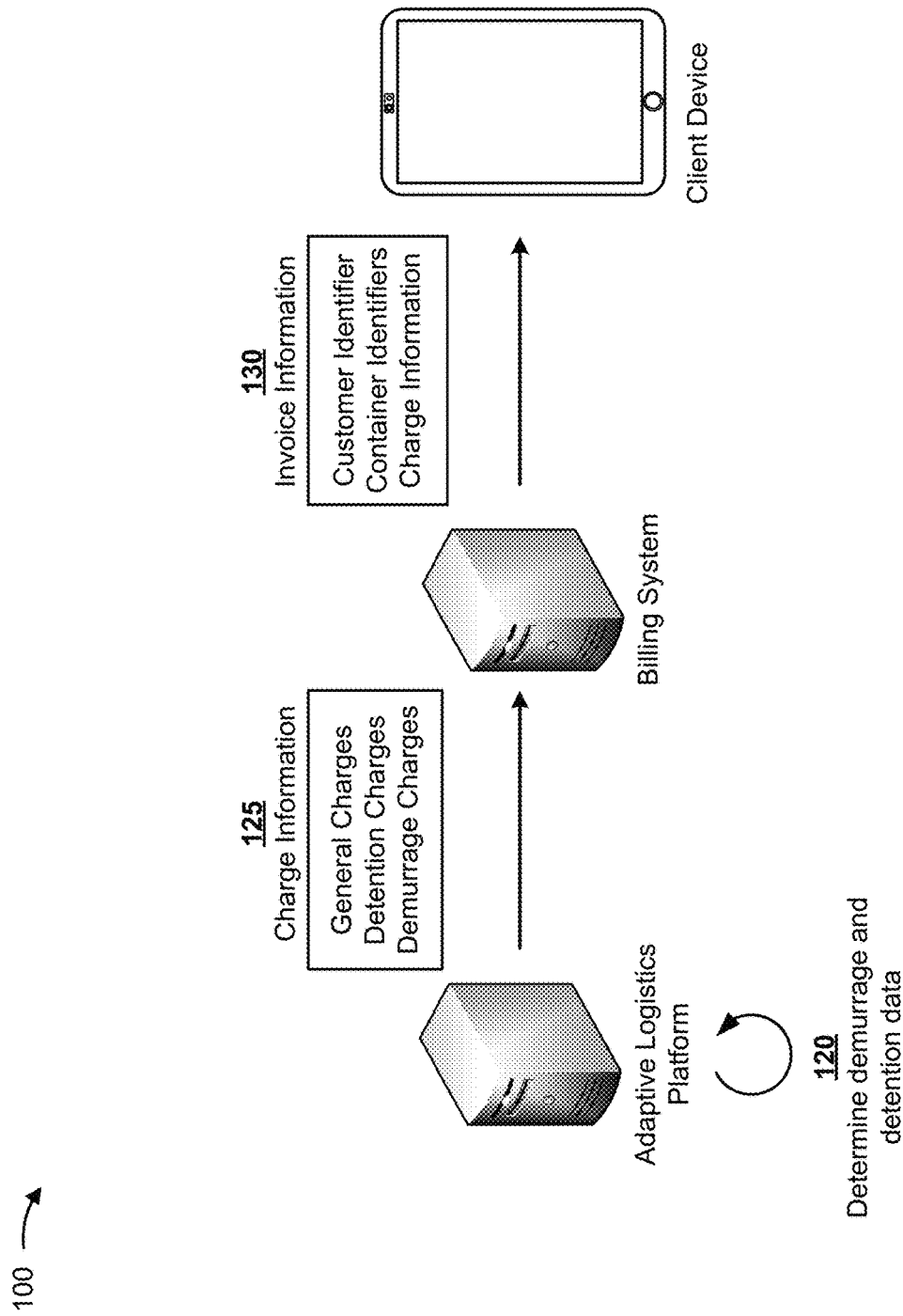
Figure 1C:
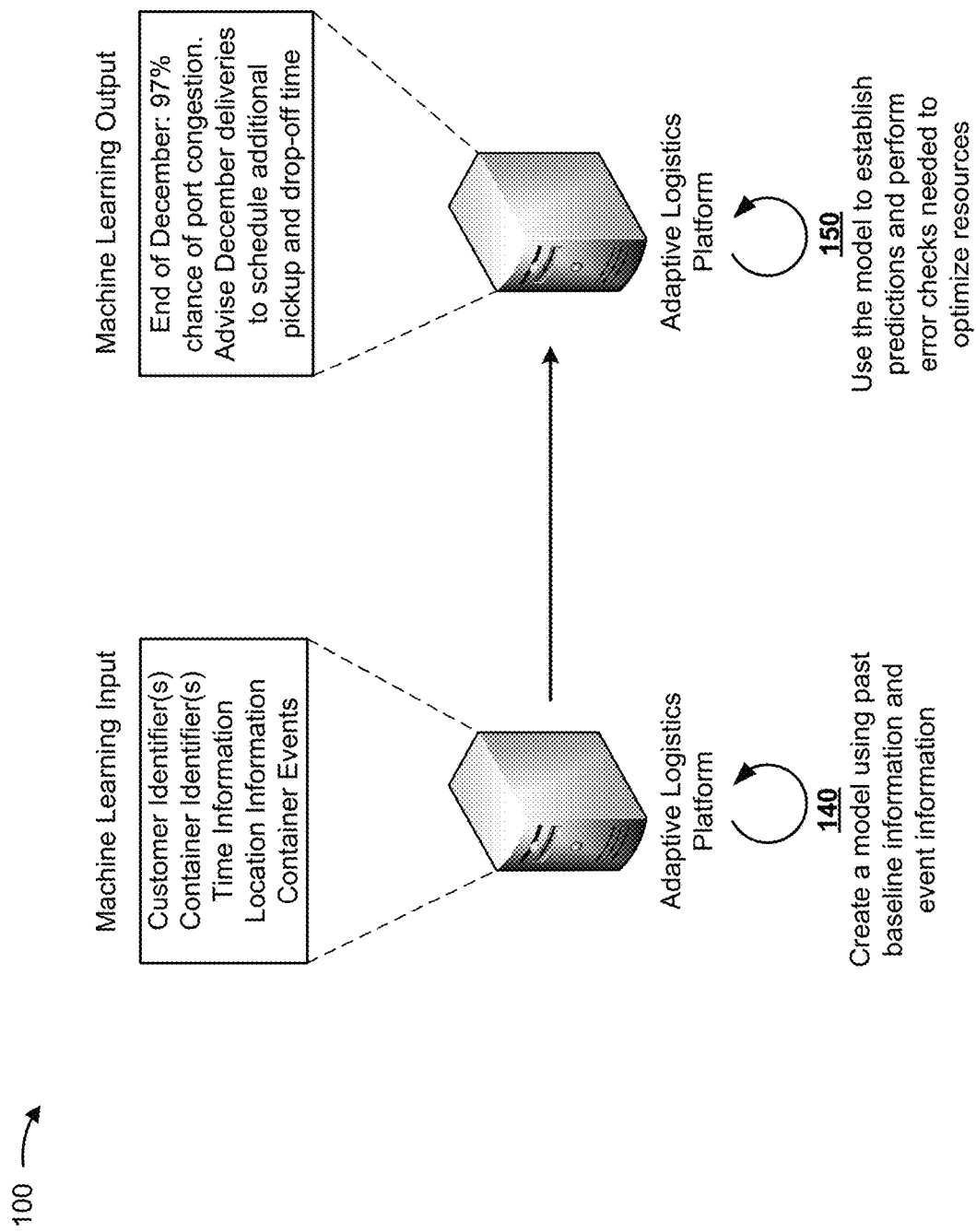

FIGS. 1A, 1B, and 1C are diagrams of an overview of an example implementation 100 described herein. As shown in FIG. 1A, and by reference number 105, a client device may read a data structure from a server (e.g., a server hosting a web portal) that requests baseline information as a user input, and the baseline information may be provided to a baseline storage system (e.g., a contract storage system). The baseline information may include information regarding a shipping contract between a shipper and a buyer and a seller. For example, the baseline information may include a customer identifier (e.g., an identifier for the buyer, an identifier for the seller, an identifier for a freight forwarder, etc.), location information (e.g., a location drop-off point, a location pickup point, etc.), time information (e.g., a time for drop-off, a time for pickup, a time period for determining demurrage and/or detention data, an exception period to credit a buyer or a seller if the buyer or the seller is not at fault for the shipping delay, etc.), charge information (e.g., daily or hourly demurrage and/or detention rates), and/or other information that may be included in a contract between a shipper and a buyer or seller.

As shown by reference number 110, an adaptive logistics platform may receive event information from one or more event reporting devices. For example, event information may include information associated with booking a cargo container, information associated with a container event (e.g., a container pickup, a container drop-off, a container status, etc.), exception events (e.g., port congestion delays, customs delays, processing delays by the shipping carrier, port employee strikes, weather, etc.), or the like. In some implementations, as shown, the event information may include a customer identifier, one or more container identifiers, information that identifies one or more container events, and/or information that identifies one or more exception events.

As shown by reference number 115, the adaptive logistics platform may receive baseline information. In some implementations, the baseline storage system may send, to the adaptive logistics platform, baseline information associated with a shipping order. Throughout the shipping process, the adaptive logistics platform may use a customer identifier to track real-time updates on the status of a client's cargo, and to determine demurrage and/or detention data based on the occurrence of events associated with shipping containers, as described below.

As shown in FIG. 1B, and by reference number 120, the adaptive logistics platform may determine demurrage and/or detention data. For example, the adaptive logistics platform may use the event information to determine that a buyer or a seller has failed to pick up a container within a threshold interval (e.g., within a pickup or drop-off time period). In some implementations, the adaptive logistics platform may use the event information to determine whether any exception events apply. As a result, the adaptive logistics platform may determine demurrage and/or detention data based on the amount of time the buyer or seller was late, the amount of time expended by exception events, and the demurrage and/or detention amount agreed upon in the shipping contract. Additionally, or alternatively, the adaptive logistics platform may determine demurrage and/or detention data based on a weighting algorithm that interprets a group of criteria.

As shown by reference number 125, the adaptive logistics platform may send charge information to a billing system. Charge information may include general billing charges, demurrage charges, detention charges, and/or any other information relevant to a client invoice.

As shown by reference number 130, the billing system may send invoice information to a client device. For example, invoice information may include a customer identifier, container identifiers, charge information, or the like.

As shown in FIG. 1C, and by reference number 140, the adaptive logistics platform may create a model using past baseline information and event information. For example, the adaptive logistics platform may create a model using artificial intelligence and/or machine learning techniques (e.g., artificial neural networks, Bayesian statistics, linear and quadratic classifiers, learning automata, etc.). In some implementations, the adaptive logistics platform may create a model that compares past baseline information and event information by considering customer identifiers (e.g., a unique identifier to differentiate between each buyer, seller, and/or freight forwarder), container identifiers (e.g., a unique container identifier to differentiate between containers), time information (e.g., a time and date for each shipping request, a frequency associated with a buyer or a seller shipping request, etc.), location information (e.g., GPS coordinates associated with a shipping vessel, GPS coordinates associated with a container, etc.), container events (e.g., damage to a container), and/or any other information that may be used to create a model. Here, the adaptive logistics platform may use the baseline information and event information to look for patterns and reoccurring trends.

In some implementations, the adaptive logistics platform may create a model that uses time information and location information to look for patterns and reoccurring trends. For example, the adaptive logistics platform may use a model to determine that port congestion is likely to occur during the end of the year (e.g., due to an increase in the sale of goods during the holiday period). In this case, the adaptive logistics platform may determine port congestion with a model that maps out the movement of all shipping customers over a sample size of five years. The adaptive logistics platform may create the map by recording GPS coordinates of each shipping vessel and/or each shipping container. By taking, for example, hourly GPS readings, the adaptive logistics platform model may show that a shipping vessel and/or shipping container is in motion or is at rest. The adaptive logistics platform may use this intelligence to come to conclusions regarding port congestion (e.g., a container that reaches a port and docks immediately may be indicative of no port congestion, while a container that sits motionless just outside of the dock may be indicative of port congestion). Here, the adaptive logistics platform model may determine that during the final two weeks of December, shipping vessels and/or shipping containers spend 30% more time motionless outside of a port (as compared to the average month). This information allows the adaptive logistics platform to make future predictions that optimize resources (both computing and personnel).

As shown by reference number 150, the adaptive logistics platform may establish predictions needed to optimize resources. For example, the adaptive logistics platform may use a model based on time information and location information to make predictions. As an example, the adaptive logistics platform may predict that port congestion is likely to occur during the final two weeks of December. In this case, adaptive logistics platform may use the prediction to make recommendations to the shipping carrier that may optimize resources. Here, the adaptive logistics platform may recommend that the shipping carrier hire additional workers during the holiday periods, or may recommend that the shipping carrier increase the rate of the demurrage and/or detention charge over the holiday to increase the chance that a buyer or seller will return the containers in a timely fashion. In addition, the adaptive logistics platform may recommend that the shipping carrier alter the amount of computing resources used to monitor the system (e.g., there is no reason to have GPS information sent to the adaptive logistics platform every hour if predictive analytics conclude that a container is likely to be stuck in its current location for the next four hours).

In this way, demurrage and/or detention data may be more accurately determined, allowing for efficient and effective allocation of resources (e.g., computing resources or personnel). For example, demurrage and/or detention data may be determined by utilizing a system that conserves network resources by sending less data because the adaptive logistics platform may obtain only a portion of the baseline information from an external server (e.g., a baseline storage system) to determine the data. Furthermore, the adaptive logistics platform may conserve memory resources by storing baseline information on an external server (e.g., a baseline storage system). In addition, the adaptive logistics platform may conserve processing resources because baseline information does not have to be retrieved from a local database. Additionally, or alternatively, these determinations may be made without an external server (e.g., a baseline storage system) which may improve demurrage and/or detention determinations by eliminating possible bottlenecks or external system errors.

As indicated above, FIGS. 1A, 1B, and 1C are provided merely as an example. Other examples are possible and may differ from what was described with regard to FIGS. 1A, 1B, and 1C.

Figure 2:
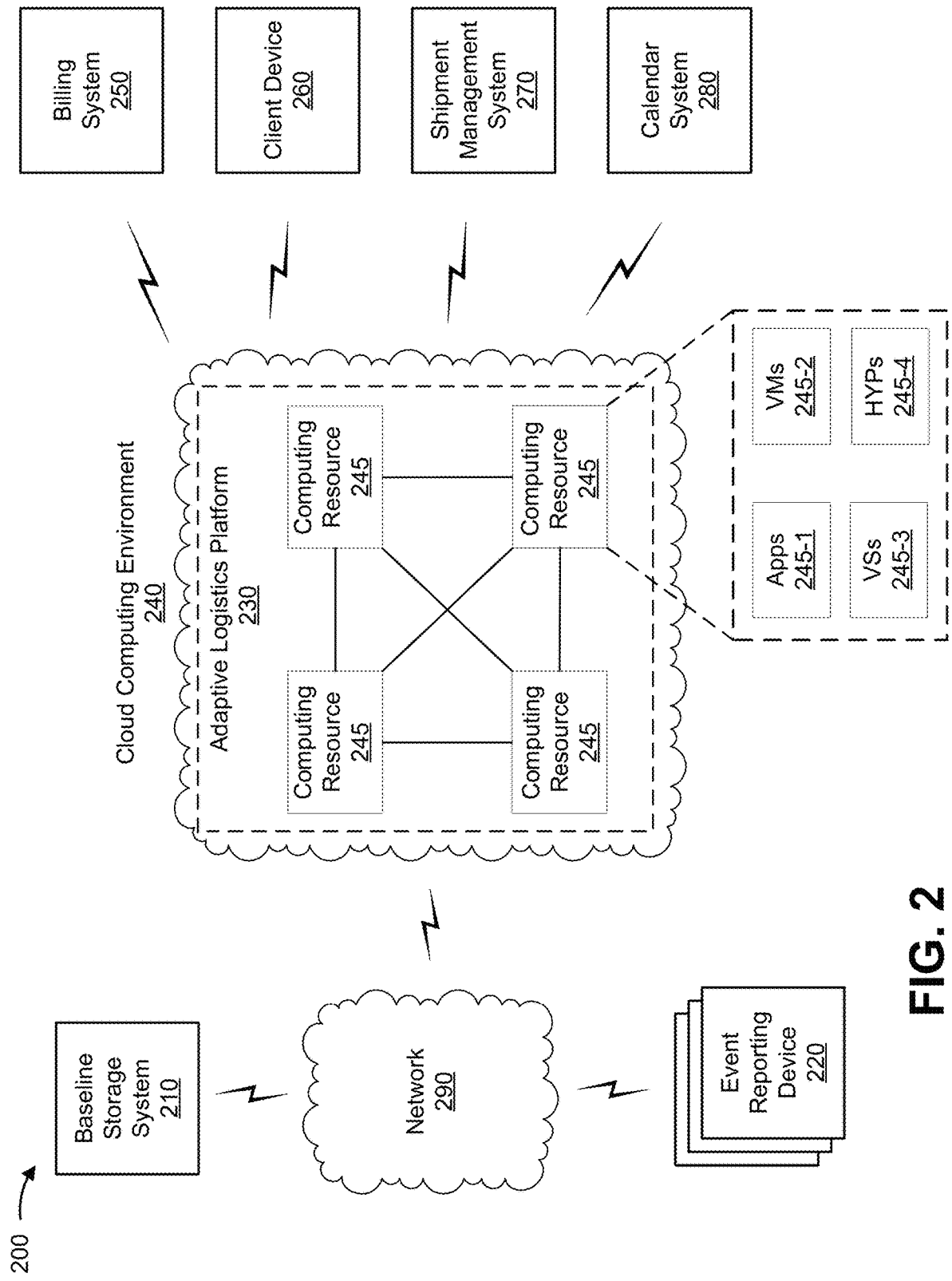
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a baseline storage system 210, one or more event reporting devices 220, an adaptive logistics platform 230 hosted within a cloud computing environment 240, a billing system 250, a client device 260, a shipping management system 270, a calendar system 280, and a network 290. Devices of environment 200 may interconnect via wired connections, wireless connections, or a combination of wired and wireless connections.

Baseline storage system 210 includes one or more devices capable of receiving, storing, processing, and/or providing baseline information. For example, baseline storage system 210 may include a computing device, such as a desktop computer, a laptop computer, a server, or a group of servers. In some implementations, baseline storage system 210 may host an application associated with contractual data management and/or may store the baseline information (e.g., such that baseline storage system 210 may provide the baseline information to adaptive logistics platform 230).

Event reporting device 220 includes one or more devices capable of receiving, generating, storing, processing, monitoring, capturing, and/or providing event information For example, event reporting device 220 may include a computing device, such as a desktop computer, a laptop computer, a mobile device (e.g., a mobile phone), a tablet computer, a wearable computer (e.g., a smart watch, a smart band, or a smart pair of eyeglasses), a server, a camera, a sensor, a satellite, or the like. In some implementations, a user may interact with event reporting device 220 to input event information when a container event or an exception event, associated with determining demurrage and/or detention data. For example, a user may input event information to a user interface (e.g., a container event, such as the arrival time of a container at a port and/or an exception event, such as a port docking delay due to port congestion). In some implementations, event reporting device 220 may capture and/or report event information automatically. For example, event reporting device 220 (e.g., a computer with a camera) may automatically capture and/or report event information based on detecting a container event and/or an exception event associated with the container to which the event reporting device is assigned to monitor.

In some implementations, event reporting device 220 includes one or more sensors configured to detect a container event. For example, event reporting device 220 may include a sensor to sense information regarding a physical environment associated with a container, such as a sensor to measure geographic location, speed, acceleration, time of day, amount of sunlight, temperature level, humidity level, oxygen level, carbon monoxide level, moisture level, wind level, or the like. In some implementations, event reporting device 220 may be attached or affixed to a container. In this case, event reporting device 220 may automatically generate and/or report event information based on detecting a container event or an exception event associated with the container to which event reporting device is attached or affixed.

Adaptive logistics platform 230 includes one or more devices capable of determining demurrage and/or detention data. For example, adaptive logistics platform 230 may determine the demurrage and/or detention data using baseline information and/or event information. For example, adaptive logistics platform 230 may include a server or a group of servers.

In some implementations, as shown, adaptive logistics platform 230 may be hosted in cloud computing environment 240. Notably, while implementations described herein describe adaptive logistics platform 230 as being hosted in cloud computing environment 240, in some implementations, adaptive logistics platform 230 may not be cloud-based (i.e., may be implemented outside of a cloud computing environment) or may be partially cloud-based.

Cloud computing environment 240 includes an environment that hosts adaptive logistics platform 230. Cloud computing environment 240 may provide computation, software, data access, storage, etc. services that do not require end-user knowledge of a physical location and configuration of system(s) and/or device(s) that hosts adaptive logistics platform 230. As shown, cloud computing environment 240 may include a group of computing resources 245 (referred to collectively as "computing resources 245" and individually as "computing resource 245").

Computing resource 245 includes one or more personal computers, workstation computers, server devices, or another type of computation and/or communication device. In some implementations, computing resource 245 may host adaptive logistics platform 230. The cloud resources may include compute instances executing in computing resource 245, storage devices provided in computing resource 245, data transfer devices provided by computing resource 245, etc. In some implementations, computing resource 245 may communicate with other computing resources 245 via wired connections, wireless connections, or a combination of wired and wireless connections.

As further shown in FIG. 2, computing resource 245 may include a group of cloud resources, such as one or more applications ("APPs") 245-1, one or more virtual machines ("VMs") 245-2, virtualized storage ("VSs") 245-3, one or more hypervisors ("HYPs") 245-4, or the like.

Application 245-1 may include one or more software applications that may be provided to or accessed by baseline storage system 210, event reporting device 220, billing system 250, and/or client device 260. Application 245-1 may eliminate a need to install and execute the software applications on these devices. For example, application 245-1 may include software associated with adaptive logistics platform 230 and/or any other software capable of being provided via cloud computing environment 240. In some implementations, one application 245-1 may send/receive information to/from one or more other applications 245-1, via virtual machine 245-2.

Virtual machine 245-2 may include a software implementation of a machine (e.g., a computer) that executes programs like a physical machine. Virtual machine 245-2 may be either a system virtual machine or a process virtual machine, depending upon use and degree of correspondence to any real machine by virtual machine 245-2. A system virtual machine may provide a complete system platform that supports execution of a complete operating system ("OS"). A process virtual machine may execute a single program, and may support a single process. In some implementations, virtual machine 245-2 may execute on behalf of another device (e.g., baseline storage system 210, event reporting device 220, billing system 250, and/or client device 260), and may manage infrastructure of cloud computing environment 240, such as data management, synchronization, or long-duration data transfers.

Virtualized storage 245-3 may include one or more storage systems and/or one or more devices that use virtualization techniques within the storage systems or devices of computing resource 245. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 245-4 may provide hardware virtualization techniques that allow multiple operating systems (e.g., "guest operating systems") to execute concurrently on a host computer, such as computing resource 245. Hypervisor 245-4 may present a virtual operating platform to the guest operating systems, and may manage the execution of the guest operating systems. Multiple instances of a variety of operating systems may share virtualized hardware resources.

Billing system 250 includes one or more devices capable of receiving, generating, storing, processing, and/or providing invoice information (e.g., to client device 260) based on demurrage and/or detention data. For example, billing system 250 may include a computing device, such as a desktop computer, a laptop computer, a server, or a group of servers. In some implementations, billing system 250 may receive and store charge information from adaptive logistics platform 230, and may send invoice information to client device 260.

Client device 260 includes one or more devices capable of providing input to one or more other devices of environment 200, and/or receiving output from one or more other devices of environment 200. For example, client device 260 may include a computing device, such as a mobile phone (e.g., a smart phone, a radiotelephone, etc.), a laptop computer, a tablet computer, a handheld computer, a wearable communication device (e.g., a smart wristwatch, a pair of smart eyeglasses, a sensor, etc.), or a similar type of device. In some implementations, a user may interact with client device 260 to provide input, such as baseline information, to one or more other devices of environment 200 (e.g., baseline storage system 210 and/or adaptive logistics platform 230). Additionally, or alternatively, client device 260 (e.g., the same client device 260 or a different client device 260) may be used to receive output, such as invoice information, from one or more devices of environment 200 (e.g. adaptive logistics platform 230 and/or billing system 250).

Shipment management system 270 includes one or more devices capable of receiving, generating, storing, processing and/or providing booking information. For example, storing management system 270 may include a computing device, such as a desktop computer, a laptop computer, a server, or a group of servers. In some implementations, shipment management system 270 may store booking information (e.g., scheduling information about a shipment of goods) that may be used by baseline storage system 210 and/or adaptive logistics platform 230 to determine baseline information.

Calendar system 280 includes one or more devices capable of receiving, generating, storing, processing and providing calendar information. For example, calendar system 280 may include a computing device, such as a desktop computer, a laptop computer, a server, or a group of servers. In some implementations, calendar system 280 may store calendar information (e.g., information about a holiday) that may be used by event reporting device 220 and/or adaptive logistics platform 230 to determine exception events.

Network 290 includes one or more wired and/or wireless networks. For example, network 290 may include a cellular network (e.g., a long-term evolution (LTE) network, a 3G network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
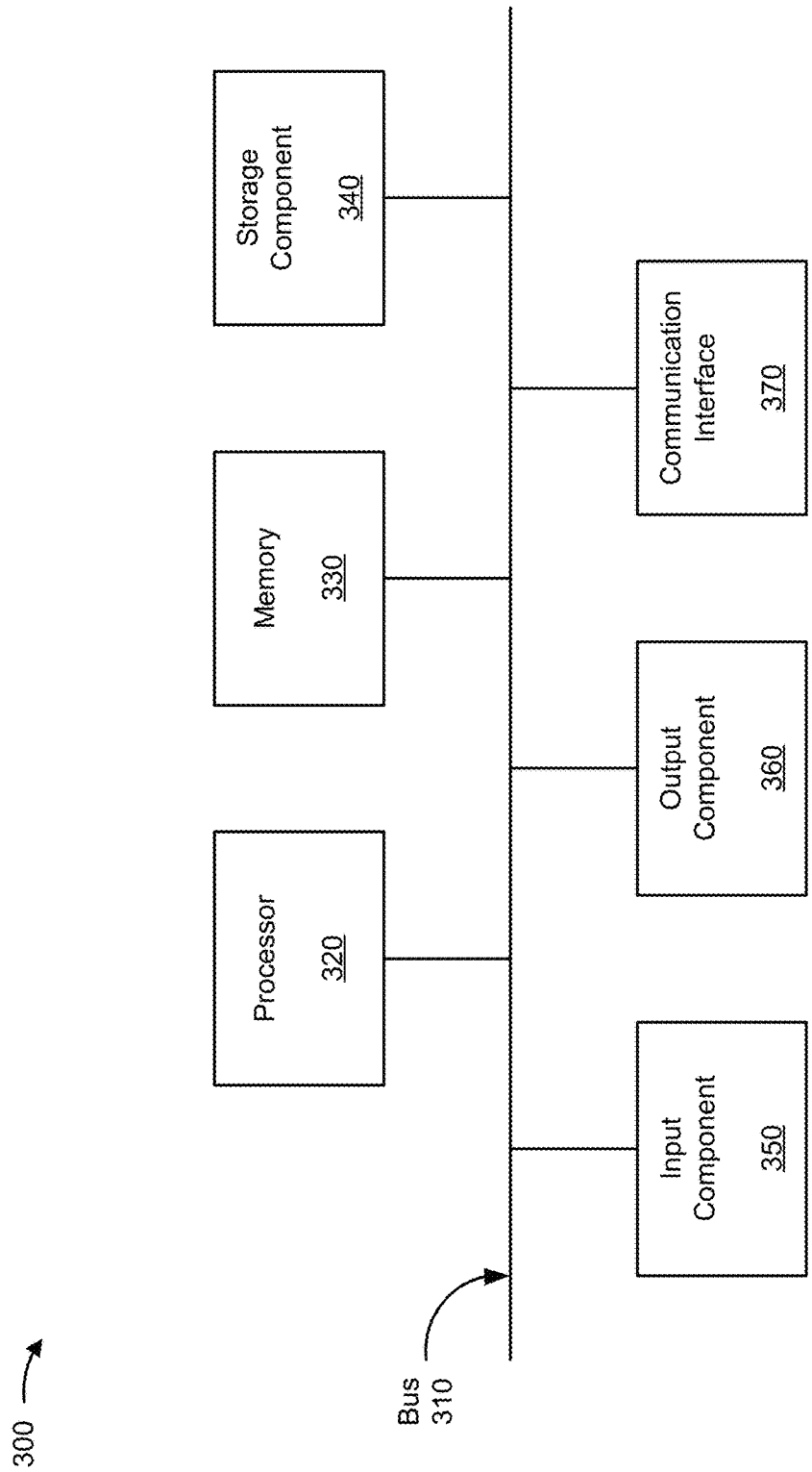
FIG. 3 is a diagram of example components of one or more devices of FIG. 2.

FIG. 3 is a diagram of example components of a device 300. Device 300 may correspond to baseline storage system 210, event reporting device 220, adaptive logistics platform 230, computing resource 245, billing system 250, client device 260, shipping management system 270, and/or calendar system 280. In some implementations, baseline storage system 210, event reporting device 220, adaptive logistics platform 230, computing resource 245, billing system 250, client device 260, shipping management system 270, and/or calendar system 280 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 includes a processor (e.g., a central processing unit (CPU), a graphics processing unit (GPU), and/or an accelerated processing unit (APU)), a microprocessor, a microcontroller, and/or any processing component (e.g., a field-programmable gate array (FPGA) and/or an application-specific integrated circuit (ASIC)) that interprets and/or executes instructions. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
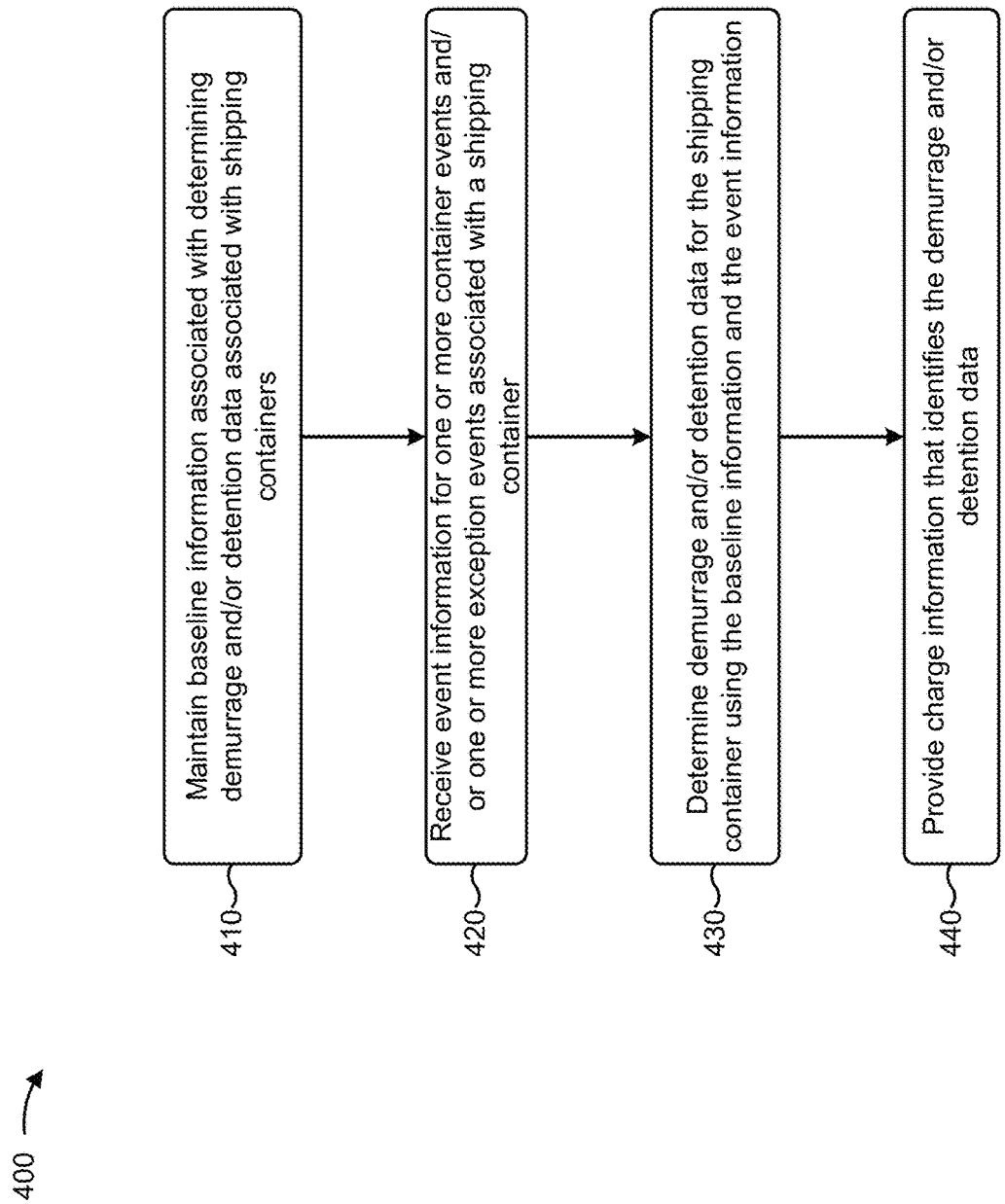
FIG. 4 is a flow chart of an example process for determining demurrage and/or detention data for a shipping container using baseline information and event information.

FIG. 4 is a flow chart of an example process 400 for determining demurrage and/or detention data for a shipping container using baseline information and event information. In some implementations, one or more process blocks of FIG. 4 may be performed by adaptive logistics platform 230. In some implementations, one or more process blocks of FIG. 4 may be performed by another device or a group of devices separate from or including adaptive logistics platform 230, such as baseline storage system 210, event reporting device 220, billing system 250, client device 260, shipping management system 270, and/or calendar system 280.

As shown in FIG. 4, process 400 may include maintaining baseline information associated with determining demurrage and/or detention data associated with shipping containers (block 410). For example, adaptive logistics platform 230 may receive baseline information. The baseline information may include information relating to a contract, such as a customer identifier (e.g., an identifier of a buyer of goods, an identifier of a seller of goods, etc.), location information (e.g., a location drop-off point, a location pickup point, etc.), time information (e.g., a time for drop-off, a time for pickup, a time period for determining demurrage and/or detention data, an exception period to credit a buyer or a seller if the buyer or the seller is not at fault for the shipping delay, etc.), charge information (e.g., daily or hourly demurrage and/or detention rates), booking information (e.g., a vessel to be used for the shipping transaction, a container or group of containers to be used for the shipping transaction, etc.), and/or other information that may be included in a contract between a shipper and a buyer or a seller.

Adaptive logistics platform 230 may generate demurrage and/or detention data using the baseline information and the event information. For example, demurrage and/or detention data may include information identifying a customer responsible for demurrage and/or detention (e.g., using a customer identifier), information identifying a container associated with demurrage and/or detention (e.g., using a container identifier), information relating to the demurrage and/or detention amount owed (e.g., daily or hourly demurrage and/or detention rates, a total amount owed for demurrage and/or detention), information that identifies one or more container events that trigger demurrage and/or detention data to be determined (e.g., that trigger demurrage and/or detention data relating to charges), information that identifies one or more exception events that trigger an exception to demurrage and/or detention (e.g., an exception to demurrage and/or detention data), and/or any other information that may relate to demurrage and/or detention.

In some implementations, adaptive logistics platform 230 may receive baseline information from client device 260 and/or baseline storage system 210. For example, client device 260 may read a data structure from a server (e.g., a server hosting a webpage) that requests baseline information as a user input. Here, a user may interact with client device 260 to execute a web browser and input baseline information into fields of a web page or a web portal. The baseline information may be sent to baseline storage system 210. Baseline storage system 210 may provide the baseline information to adaptive logistics platform 230. Additionally, or alternatively, adaptive logistics platform 230 may receive baseline information directly from client device 260.

In some implementations, adaptive logistics platform 230 may receive baseline information from baseline storage system 210, client device 260, and/or shipment management system 270. For example, adaptive logistics platform 230 may receive baseline information such as booking information from shipment management system 270 while receiving the remainder of the baseline information from baseline storage system 210 and/or client device 260.

In some implementations, adaptive logistics platform 230 may analyze a contract document to determine the baseline information. For example, a user may interact with client device 260 to upload an electronic copy of a shipping contract (e.g., to baseline storage system 210 and/or adaptive logistics platform 230). In this case, adaptive logistics platform 230 may use natural language processing to parse the shipping contract and extract the baseline information used to determine demurrage and/or detention data. Additionally, or alternatively, the shipping contract may include an electronic document with tagged fields of information, and adaptive logistics platform 230 may parse the electronic document to identify baseline information included in the tagged fields.

In some implementations, adaptive logistics platform 230 may receive baseline information from client device 260 and/or baseline storage system 210 from baseline information being input by a user. For example, client device 260 may send baseline information to baseline storage system 210, which may subsequently send baseline information to adaptive logistics platform 230. Additionally, or alternatively, adaptive logistics platform 230 may receive baseline information directly from client device 260. Storing baseline information on adaptive logistics platform 230 permits faster determination of demurrage and/or detention data because adaptive logistics platform 230 can access the baseline information without needing to query baseline storage system 210.

In some implementations, adaptive logistics platform 230 may request and/or receive a portion of the baseline information from baseline storage system 210 on an as-needed basis (e.g., based on an occurrence of a container event, described below). For example, adaptive logistics platform 230 may request baseline information (e.g., daily and/or hourly charges for demurrage and/or detention) from baseline storage system 210 using, for example, a customer identifier. Baseline storage system 210 may use the customer identifier to identify appropriate baseline information (e.g., by searching a data structure using the customer identifier), and may provide the appropriate baseline information to adaptive logistics platform 230. In this case, adaptive logistics platform 230 may use the requested baseline information to determine demurrage and/or detention data on an as-needed basis. This conserves network resources by sending less data (e.g., by only sending a relevant portion of the baseline information), conserves memory resources of adaptive logistics platform 230 (e.g., by storing baseline information on a separate device and/or by storing a subset of baseline information locally), and conserves processing resources of adaptive logistics platform 230 (e.g., because the baseline information does not have to be retrieved from a database of adaptive logistics platform 230 and/or a contract document does not need to be parsed to identify the baseline information).

As further shown in FIG. 4, process 400 may include receiving event information for one or more container events and/or one or more exception events associated with a shipping container (block 420). For example, adaptive logistics platform 230 may receive event information for one or more container events. In some implementations, a container event may include any event associated with a container pickup (e.g., a seller pickup of an empty container or a buyer pickup of a full container), a container drop-off (e.g., a seller drop-off of a full container or a buyer drop-off of an empty container), a container arrival at a port, and/or a container departure from a port. A container event may be used to signal the beginning or the end of a time period used to determine demurrage and/or detention data.

In some implementations, adaptive logistics platform 230 may receive event information for one or more exception events from event reporting device 220. An exception event may include any event associated with a delay in shipping that is not the fault of the buyer or the seller (e.g., that is an exception to a determination of demurrage and/or detention data, and/or that offsets or modifies an amount owed for demurrage and/or detention). For example, an exception event may include a port congestion delay (e.g., a vessel reaches an arrival port but cannot dock due to delay caused from other vessels), a customs delay (e.g., a delay from a customs examination relating to the type and weight of goods, a documentation check needed to get through customs, etc.), a processing delay by the shipping carrier (e.g., an inventory check to ensure cargo is not damaged), a port employee strike or other type of strike (e.g., a group of port employees go on strike, causing port delays), a weather delay (e.g., that may cause a vessel to arrive at a port after a scheduled arrival time or that may disrupt a pickup or drop-off of a container), and/or any other event that may cause a shipping delay for which the buyer or seller is not at fault. An exception event may be used to offset the demurrage and/or detention expense by an amount proportional to the duration of the exception event.

In some implementations, adaptive logistics platform 230 may receive calendar information from calendar system 280 to help determine exception events. For example, adaptive logistics platform 230 may receive calendar information such information regarding a holiday. Adaptive logistics platform 230 may use this calendar information in conjunction with exception events to determine if a demurrage and/or detention expense may need to be offset.

In some implementations, a container event and/or an exception event may trigger event reporting device 220 to send event information. For example, event reporting device 220 may receive a trigger from a user input and/or may receive a trigger automatically in real-time based on occurrence of an event.

In some implementations, such as when event reporting device 220 includes a computing device, event reporting device 220 may provide event information based on a user input. For example, a user may input, to a computing device, that a buyer or a seller pickup of a container has occurred and/or that a buyer or a seller drop-off of a container has occurred. As another example, a user may input, to a computing device, that a shipping delay is occurring due to port congestion, a customs delay, a delay caused by a shipping carrier, and/or any other delay that is not the fault of the buyer or seller.

Additionally, or alternatively, such as when event reporting device 220 includes a computing device, event reporting device 220 may capture and/or report event information automatically. For example, a computing device (e.g., a computer with a camera) may automatically capture and/or report event information based on detecting a container event or an exception event associated with the container to which the event reporting device is assigned to monitor. Here, a computing device may capture and/or report container information, such as a buyer or a seller pickup of a container or a buyer or seller drop-off of a container. As another example, a computing device may capture and/or report exception information, such as a shipping delay due to port congestion, a customs delay, a processing delay caused by a shipper, and/or any other delay that is not the fault of the buyer or seller.

In some implementations, adaptive logistics platform 230 may automatically search the Internet for information relating to exception events, such as by searching for weather data that may be associated with a weather delay, searching for news data that may help identify a strike by port employees, or the like. Additionally, or alternatively, adaptive logistics platform 230 may use GPS data to determine if port congestion or another exception event exists. For example, adaptive logistics platform 230 may receive GPS data from a GPS tracker of a shipping vessel to determine whether the shipping vessel has stopped prior to reaching the port (e.g., by taking periodic location measurements and flagging the absence of a change in location). Additionally, or alternatively, adaptive logistics platform 230 may use GPS data associated with multiple shipping vessels to determine whether there is port congestion (e.g., based on a quantity of shipping vessels located within geographic proximity of a port, based on a quantity of docking locations supported by the port, etc.).

In some implementations, such as when event reporting device 220 includes a sensor, event reporting device 220 may provide event information based on detecting an event. For example, a sensor on or near a shipping container may determine GPS location (e.g., seller warehouse, departure port, arrival port, buyer warehouse, etc.) to send real-time container event updates or real-time exception event updates to adaptive logistics platform 230. Accurate determinations of demurrage and/or detention charges can be made due to the real-time transmission (or collection) of event information.

In some implementations, such as when event reporting device 220 includes both sensors and computing devices, the one or more computing devices may trigger separate events. For example, a sensor on or near a shipping container may determine when a filled container is picked up by a buyer at the arrival port, while a user may input, to a computing device, the time the buyer drops off the empty container. As another example, a sensor on or near a shipping container may determine an exception event, such as a port congestion delay, while a user may input, to a computing device, customs delays.

In some implementations, event information may include a customer identifier that identifies a customer associated with a container event (e.g., a buyer, seller, or freight forwarder that picks up a container or a buyer, seller, or freight forwarder that drops off a container), an event identifier that identifies a type of container event (e.g., a container pickup or a container drop-off, which may trigger calculation of demurrage and/or detention charges), a container identifier that identifies a container associated with the container event (e.g., a container being picked up or dropped off), an exception identifier that identifies a container associated with the exception event (e.g., due to port congestion delays, customs delays, shipping carrier processing delays, weather, etc.), a location associated with the container event (e.g., an arrival and/or departure port check-in location, a container GPS location, a location of the container at a port, etc.), a time associated with the container event (e.g., a date and/or time that a container was picked up or dropped off), and/or other information associated with the container event.

In some implementations, event information may include one or more event identifiers that correspond to container events. For example, one or more event identifiers (e.g., a demurrage start timer, a demurrage stop timer, a detention start timer, a detention stop timer, etc.) may correspond to container events (e.g., a seller pickup up of an empty container, a seller drop-off of a full container, a buyer pickup of a full container, a buyer drop-off of an empty container, etc.) to determine if a buyer and/or a seller has picked up or dropped off a container within a threshold interval. In this case, event information may be used to determine demurrage and/or detention charges.

In some implementations, event information may include one or more exception identifiers that correspond to exception events. For example, one or more exception identifiers (e.g., a demurrage exception start timer, a demurrage exception stop timer, a detention exception start timer, a detention exception stop timer, etc.) may correspond to exception events (e.g., a shipping vessel reaches an arrival port but cannot dock due to port congestion, a shipping vessel docks at the arrival port at the conclusion of the port congestion, a buyer attempts to drop off an empty container but cannot due to a strike by port employees, a buyer drops off an empty container at the conclusion of a strike by port employees, etc.) to determine if a buyer and/or a seller may offset the demurrage and/or detention expense by an amount proportional to the duration of the exception event.

As further shown in FIG. 4, process 400 may include determining demurrage and/or detention charges for the shipping container using the baseline information and the event information (block 430). For example, adaptive logistics platform 230 may use the baseline information and the event information to determine if a buyer or a seller fails to pick up or drop off a container within a threshold interval. Here, if a buyer or a seller fails to pick up or drop off a container within a threshold interval, adaptive logistics platform 230 may use the contracted demurrage and/or detention rates to determine an appropriate charge. In some implementations, adaptive logistics platform 230 may use the baseline information and the event information to determine if an exception event warrants a modification to demurrage and/or detention data, such as a reduction in demurrage and/or detention expenses. Here, adaptive logistics platform 230 may use exception events to determine that a buyer and/or a seller was unable to pick up a container until four hours later due to port congestion and the time caused by the delay may be credited back to the buyer or seller when determining demurrage and/or detention expenses.

In some implementations, adaptive logistics platform 230 may determine demurrage and/or detention data (e.g., information relating to expenses) by using the contracted demurrage and/or detention rates and a total overage period. For example, adaptive logistics platform 230 may determine a total overage period by first comparing the threshold interval (e.g., a pickup or drop-off time period) with the actual period that a buyer and/or a seller took to pick up a container and/or drop off a container. Next, adaptive logistics platform 230 may determine a total overage period by subtracting out any time excused by exception events. In this case, adaptive logistics platform 230 may multiply the total overage period against a demurrage and/or detention contracted rate (e.g., daily and/or hourly) to determine the demurrage and/or detention charges.

Additionally, or alternatively, adaptive logistics platform 230 may determine demurrage and/or detention charges based on a weighting algorithm that interprets a group of criteria. For example, a group of criteria may include whether a buyer or a seller satisfies a threshold interval (e.g., for a pickup or drop-off time period), whether one or more exception events apply, whether the agreed upon demurrage and/or detention amount is fixed or variable (e.g., linear or non-linear), the terms that may cause a variable demurrage and/or detention amount to change (e.g., a demurrage and/or detention charge may vary depending on the value of the goods found in each container), and/or any other criteria that may aid in a more accurate demurrage and/or detention determination. These demurrage and/or detention determinations may be made at the conclusion of the transaction between the parties or in real-time (e.g., relative to the frequency of demurrage and/or detention data updates requested by a user).

In some implementations, adaptive logistics platform 230 may determine demurrage and/or detention data at the conclusion of a transaction between the parties. For example, the adaptive logistics platform 230 may determine demurrage and/or detention for an entire shipping transaction. This conserves processing resources because the demurrage and/or detention determination may change over the course of the shipping transaction.

Additionally, or alternatively, adaptive logistics platform 230 may determine demurrage and/or detention data in real-time (e.g., relative to the frequency of demurrage and/or detention data updates requested by a user). For example, adaptive logistics platform 230 may determine demurrage and/or detention data in real-time to allow a buyer or seller to receive a status update on the current state of any demurrage and/or detention expense that may be owed. In this case, adaptive logistics platform 230 may receive, from client device 260, a request from a user to subscribe to receive periodic updates regarding demurrage and/or detention charges. As a result of the request, adaptive logistics platform 230 may send, to client device 260, a notification (e.g., daily or hourly) in real-time regarding current demurrage and/or detention data. In this way, accurate determinations of demurrage and/or detention may be made due to the real-time transmission of baseline information and event information.

In some implementations, adaptive logistics platform 230 may determine demurrage and/or detention data based on a trigger. For example, adaptive logistics platform 230 may trigger demurrage and/or detention data based on one or more container events and/or one or more exception events. In some implementations, one or more container events may represent a demurrage and/or detention start timer and a demurrage and/or detention stop timer. Additionally, or alternatively, one or more exception events may represent a demurrage and/or detention exception start timer and a demurrage and/or detention exception stop timer. As shown below, the container event triggers may cause demurrage and/or detention charges to accrue, while the exception events may be used to offset these charges.

In some implementations, adaptive logistics platform 230 may trigger demurrage and/or detention data for a seller based on one or more container events. For example, adaptive logistics platform 230 may trigger a demurrage start timer for a seller using a contracted start time. In this case, if a seller contracts to pick up an empty container between Monday and Wednesday, then Monday may be used as a trigger start timer (e.g., to determine when the contracted period begins). Adaptive logistics platform 230 may trigger a demurrage stop timer when a seller picks up an empty container from the departure port (e.g., the total overage period may be determined by subtracting any contracted free period from the total period from start to end). In some implementations, the demurrage start timer may begin at the conclusion of the contracted free period. As another example, adaptive logistics platform 230 may trigger a detention start timer when a seller picks up an empty container from the departure port. Adaptive logistics platform 230 may trigger a detention stop timer when a seller drops off a full container to the departure port.

In some implementations, adaptive logistics platform 230 may trigger a determination of demurrage and/or detention data for a seller based on one or more exception events. For example, adaptive logistics platform 230 may trigger a demurrage exception start timer for a seller (e.g., if the seller contracts to pick up an empty container between Monday and Wednesday but the vessel spends all day Monday unable to dock due to port congestion, this may trigger the start timer). Adaptive logistics platform 230 may trigger a demurrage exception stop timer for the seller (e.g., in the example stated above, if port congestion concludes at the end of the day Monday, this may trigger the end timer). As another example, adaptive logistics platform 230 may trigger a detention exception start timer for a seller (e.g., the seller may contract to pick up an empty container from a departure dock on a Monday but find the dock is closed due to a strike, which may trigger the start timer). Adaptive logistics platform 230 may trigger a detention exception stop timer for the seller (e.g., the strike from the example stated above may end the following day, which may trigger the stop timer).

In some implementations, adaptive logistics platform 230 may trigger demurrage and/or detention charges for a buyer based on one or more container events. For example, adaptive logistics platform 230 may trigger a demurrage start timer for a buyer when a full container reaches the arrival port. Adaptive logistics platform 230 may trigger a demurrage stop timer when the buyer picks up the full container. As another example, adaptive logistics platform 230 may trigger a detention start timer for a buyer when the buyer picks up a full container from the arrival port. Adaptive logistics platform 230 may trigger a detention stop timer when the buyer drops off an empty container to the arrival port. As such, adaptive logistics platform 230 may determine demurrage and/or detention data with a trigger.

In some implementations, adaptive logistics platform 230 may determine demurrage and/or detention data for a buyer based on one or more exception events. For example, adaptive logistics platform 230 may trigger a demurrage exception start timer for a buyer (e.g., if a buyer attempts to pick up a full container at the 9:00 AM scheduled port arrival time, but due to delays from customs examinations on the cargo, the container cannot be picked up until 1:00 PM, the start of the customs delay may trigger the start time). Adaptive logistics platform 230 may trigger a demurrage exception stop timer for the buyer (e.g., in the example above, the end timer may trigger when the customs examination delay has concluded and the container becomes available for buyer pickup). As another example, adaptive logistics platform 230 may trigger a detention exception start timer for a buyer (e.g., the buyer may go to an arrival port to pick up a full container but find the dock is closed due to a strike, which may trigger the start timer). Adaptive logistics platform 230 may trigger a detention exception stop timer for the buyer (e.g., the strike from the example above may end the following day, which may trigger the stop timer). Adaptive logistics platform 230 may use these exception events to offset the initial demurrage and/or detention timer. In this way, adaptive logistics platform 230 may accurately determine demurrage and/or detention data despite a high degree of variance in events that may complicate the determination.

In some implementations, adaptive logistics platform 230 may use an artificial intelligence model and/or a machine learning technique to determine if demurrage and/or detention data contains an error. For example, adaptive logistics platform 230 may use artificial intelligence or machine learning techniques (e.g., artificial neural networks, Bayesian statistics, linear and quadratic classifiers, learning automata, etc.) to determine a range of average demurrage and/or detention cost for a sample set of shipping carriers. In this case, adaptive logistics platform 230 may determine and flag outliers for error correction (e.g., a linear regression model may determine that 98% of demurrage charges were between $100 and $3,000, making a demurrage charge of $30,000 unlikely and a result of error). Here, a user may record an improper input into a computing device which may cause the buyer or the seller to incur an inflated charge. Adaptive logistics platform 230 may flag and correct these errors to increase the accuracy of the demurrage and/or detention determinations.

In some implementations, adaptive logistics platform 230 may use an artificial intelligence model and/or a machine learning technique to send demurrage and/or detention data to a buyer or a seller in advance of incurring any charges. For example, adaptive logistics platform 230 may use artificial intelligence or machine learning techniques (e.g., artificial neural networks, Bayesian statistics, linear and quadratic classifiers, learning automata, etc.) to determine whether certain exception events are more likely to occur at certain time periods. As an example, adaptive logistics platform 230 may use artificial intelligence or machine learning to determine that port congestion is more likely to occur over a holiday due to an increase in the sale of goods. In this case, a buyer or a seller may receive advance notice which may allow the buyer or the seller to take preventative measures to plan for the arrival and delivery of the container of goods. In this way, adaptive logistics platform 230 may utilize artificial intelligence and/or machine learning techniques in ways that improve the accuracy and determination of demurrage and/or detention.

In some implementations, adaptive logistics platform 230 may use an artificial intelligence model and/or a machine learning technique to reduce the risk of non-payment by a buyer or a seller. For example, adaptive logistics platform 230 may require a buyer or a seller to pay a demurrage and/or detention charge prior to a shipment of containers. Here, adaptive logistics platform 230 may use an artificial intelligence model and/or a machine learning technique (e.g., artificial neural networks, Bayesian statistics, linear and quadratic classifiers, learning automata, etc.) to predict, based on past transactions, the amount that the buyer or the seller will owe. In this case, a buyer or a seller may simply by refunded any overcharge amount at the conclusion of the transaction. As an example, adaptive logistics platform 230 may use an artificial neural networking model to determine that a buyer or a seller is likely to commit demurrage and/or detention over a holiday period (as well as a prediction on the exact amount the buyer or the seller is likely to owe). Here, adaptive logistics platform 230 may require demurrage and/or detention payment in advance of shipping and refund the buyer or the seller if the containers are dropped off on time. In this way, adaptive logistics platform 230 is able to reduce the risk of non-payment by a buyer or a seller.

As further shown in FIG. 4, process 400 may include providing charge information that identifies the demurrage and/or detention data (block 440). For example, adaptive logistics platform 230 may provide charge information. The charge information may include demurrage and/or detention charges, as well as any other charges associated with shipping one or more containers.

In some implementations, adaptive logistics platform 230 may provide the charge information to billing system 250. In this case, billing system 250 may use the charge information to generate an invoice for a customer (e.g., using a customer identifier, billing information, etc.). In some implementations, billing system 250 may store the charge information and/or invoice information to send to client device 260 at a later time.

Additionally, or alternatively, adaptive logistics platform 230 may provide the charge information directly to client device 260. For example, adaptive logistics platform 230 may provide the charge information for display on client device 260. This allows a customer to check the status of the demurrage and/or detention charges by logging into client device 260 and viewing the charges using one or more user interfaces (e.g., an e-mail interface on a web browser).

In some implementations, adaptive logistics platform 230 may provide the charge information in real-time (e.g., relative to receiving a trigger). For example, adaptive logistics platform 230 may provide charge information to billing system 250 and/or client device 260 based on a trigger. In some implementations, the trigger may include the end of a shipping transaction, the occurrence of a container event (e.g., a pickup or drop-off of a container), a daily and/or hourly trigger (e.g., the daily and/or hourly accrual of a demurrage and/or detention charge), or the like. In this case, adaptive logistics platform 230 may send real-time updates as demurrage and/or detention charges accrue. The accuracy of the demurrage and/or detention determinations may be improved by allowing for real-time systematic reporting.

In some implementations, adaptive logistics platform 230 may aggregate the charge information for multiple containers. For example, adaptive logistics platform 230 may provide aggregate charge information (e.g., charge information associated with multiple container demurrage and/or detention charges) to billing system 250 and/or client device 260. In this case, adaptive logistics platform 230 may use a customer identifier associated with each container to aggregate a total demurrage and/or detention charge (e.g., for display on a single invoice). In some implementations, billing system 250 may aggregate the charge information for multiple containers.

In some implementations, adaptive logistics platform 230 may use an artificial intelligence model and/or a machine learning technique to determine aggregate demurrage and/or detention data for multiple contracts involving the same party. For example, adaptive logistics platform 230 may use machine learning to manage millions of data points relating to a large corporation. Here, a buyer or a seller may have thousands of shipping contracts, each of which involves thousands of containers, and each container may be subjected to any number of different container events (e.g., a buyer demurrage, a buyer detention, a seller demurrage, a seller detention, etc.) and/or exception events (e.g., port congestion delays, customs delays, processing delays by the shipping carrier, port employee strikes, weather, etc.). Adaptive logistics platform 230 may use machine learning techniques (artificial neural networks, Bayesian statistics, linear and quadratic classifiers, learning automata, etc.) to store and determine demurrage and/or detention data from separate contracts into one aggregate total. As a result, the buyer or the seller may have access to the total demurrage and/or detention charge accrued while receiving a detailed bill that explains how each particular charge was determined.

In this way, adaptive logistics platform 230 may conserve processing resources because adaptive logistics platform 230 and/or billing system 250 would not need to generate a separate invoice for each container. Furthermore, adaptive logistics platform 230 may conserve network resources by performing demurrage and/or detention determinations on an as-needed basis.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
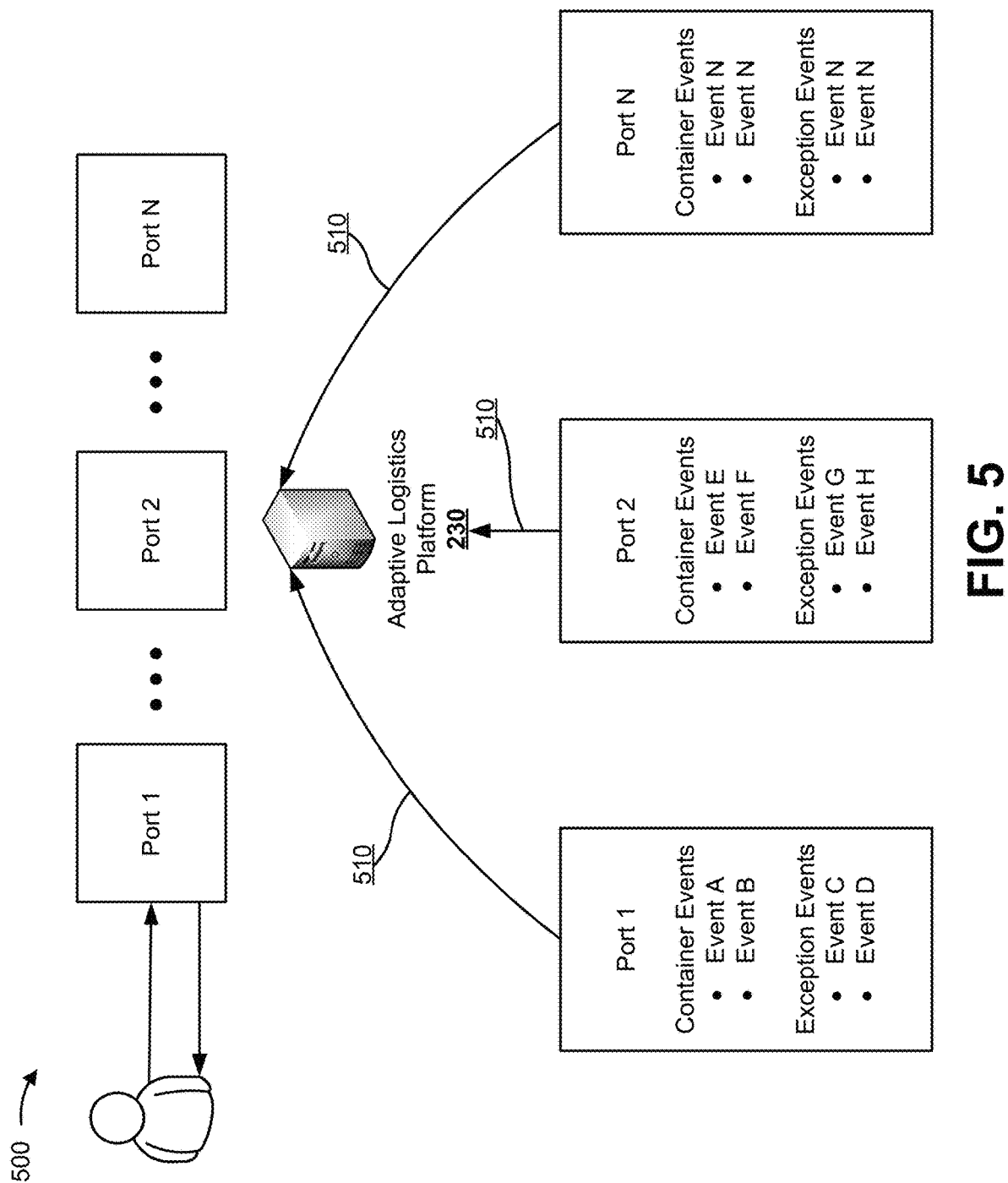
FIG. 5 is a diagram of an example implementation relating to the example process shown in FIG. 4.

FIG. 5 is a diagram of an example implementation 500 relating to example process 400 shown in FIG. 4. FIG. 5 shows an example implementation 500 relating to determining demurrage and/or detention data for a shipping container using baseline information and event information.

As shown in FIG. 5, adaptive logistics platform 230 may receive information relating to one or more container events and/or one or more exception events from one or more ports associated with one or more terminals. For example, a first user (e.g., a seller) may need to pick up or drop off 1,000+ containers at ports 1 through N (e.g., port 1, port 2, . . . port N) and a second user (e.g., a buyer) may need to pick up or drop off 1,000+ containers at ports 1 through N (e.g., port 1, port 2, . . . port N), which may be further complicated due to larger ports containing multiple terminals (e.g., a port may contain multiple docks). As shown by reference number 510, adaptive logistics platform 230 may receive information regarding container events and/or exception events from ports 1 through N to determine demurrage and/or detention data based on the occurrence of these events.

In some implementations, adaptive logistics platform 230 may receive, in association with a departure port (e.g., port 1), information regarding one or more container events (e.g., events A and B). For example, adaptive logistics platform 230 may receive information regarding one or more container events (e.g., event A) if a seller fails to pick up one or more of the empty containers from the departure port within a threshold interval (e.g., a pickup time period). Additionally, or alternatively, adaptive logistics platform 230 may receive information regarding one or more container events (e.g., event B) if a seller fails to drop off one or more of the full containers to the departure port within a threshold interval (e.g., a drop-off period). As an example, the seller may drop off 500 of the 1,000 containers (e.g., to port 1 terminal 1, to port 1 terminal 2, to port 1 terminals 1 and 2, etc.), but be late to drop off the remaining 500 containers (e.g., to port 1 terminal 1, to port 1 terminal 2, to port 1 terminals 1 and 2, etc.). In this case, adaptive logistics platform 230 receives container event information regarding both the timely and the late container drop-offs, and may use baseline information regarding a free period and daily or hourly demurrage and/or detention rates to determine if a charge may be owed by the seller.

In some implementations, adaptive logistics platform 230 may receive, in association with a departure port (e.g., port 1), information regarding one or more exception events (e.g., events C and D). For example, adaptive logistics platform 230 may receive information regarding one or more exception events (e.g., event C) if a strike occurs at the departure port (e.g., at port 1 terminal 1, at port 1 terminal 2, at port 1 terminals 1 and 2, etc.) and prevents the seller from dropping off the containers. Here, adaptive logistics platform 230 may use the duration of the strike as a credit to the seller when determining demurrage and/or detention. Additionally, or alternatively, adaptive logistics platform 230 may receive information regarding one or more exception events (e.g., event D) if excessive customs delays occur due to cargo examinations exceeding a threshold duration. As an example, the seller may get 500 of the 1,000 containers (e.g., to port 1 terminal 1, to port 1 terminal 2, to port 1 terminals 1 and 2, etc.) through customs within a threshold interval (e.g., a drop-off period) but be late to drop off the remaining 500 containers (e.g., to port 1 terminal 1, to port 1 terminal 2, to port 1 terminals 1 and 2, etc.). In this case, adaptive logistics platform 230 receives container exception information regarding the 500 late containers and may use the duration of the customs delay as a credit to the seller when determining demurrage and/or detention.

In some implementations, adaptive logistics platform 230 may receive, in association with an arrival port (e.g., port 2), information regarding one or more container events (e.g., events E and F). For example, adaptive logistics platform 230 may receive information regarding one or more container events (e.g., event E) if the buyer fails to pick up one or more of the full containers from the arrival port (e.g., from port 2 terminal 1, from port 2 terminal 2, from port 2 terminals 1 and 2, etc.). Additionally, or alternatively, adaptive logistics platform 230 may receive information regarding one or more container events (e.g., event F) if the buyer fails to drop off one or more of the empty containers to the arrival port. As an example, the buyer may drop off 500 of the 1,000 containers (e.g., to port 2 terminal 1, to port 2 terminal 2, to port 2 terminals 1 and 2, etc.) within the interval threshold (e.g., a contracted drop-off period) but be late to drop off the remaining 500 containers (e.g., to port 2 terminal 1, to port 2 terminal 2, to port 2 terminals 1 and 2, etc.). In this case, adaptive logistics platform 230 receives container event information regarding both the timely and the late container drop-offs, and may use baseline information regarding a free period and daily or hourly demurrage and/or detention rates to determine if a charge may is owed.

In some implementations, adaptive logistics platform 230 may receive, in association with an arrival port (e.g., port 2), information regarding one or more exception events (e.g., events G and H). For example, adaptive logistics platform 230 may receive information regarding one or more exception events (e.g., event G) if the buyer cannot pick up the containers due to port congestion. In this case, the vessel containing the cargo may be scheduled to dock at 9:00 AM but not actually dock until 1:00 PM due to a backlog in shipping vessels at the port (e.g., at port 2 terminal 1, at port 2 terminal 2, at port 2 terminal 1 and 2, etc.). Here, adaptive logistics platform 230 may use the duration of the port congestion (e.g., 4 hours) as a credit to the buyer when determining demurrage and/or detention. Additionally, or alternatively, adaptive logistics platform 230 may receive information regarding one or more exception events (e.g., event H) for shipping carrier processing delays. In this case, the shipping carrier may spend an excessive amount of time (e.g., greater than a threshold amount of time) doing an inventory check at the port (e.g., at port 2 terminal 1, at port 2 terminal 2, at port 2 terminals 1 and 2, etc.) before releasing the containers to the buyer. Here, adaptive logistics platform 230 may use the duration of the shipping carrier processing delay as a credit to the buyer when determining demurrage and/or detention.

In some implementations, adaptive logistics platform 230 may determine demurrage and/or detention data that incorporates information associated with the occurrence of one or more container events and/or exception events. In this way, demurrage and/or detention data may be more accurately determined, allowing for efficient and effective allocation of resources (e.g., computing resources or personnel). Furthermore, such information may be aggregated for tens, hundreds, or thousands of customers, containers, shipping vessels, ports, container events, and/or exception events to accurately provide demurrage and/or detention data in a timely manner. In addition, adaptive logistics platform 230 may determine demurrage and/or detention data for transactions involving multiple modes of transportation.

In some implementations, adaptive logistics platform 230 may serve as a multi-modal platform and determine demurrage and/or detention data across multiple modes of transport (e.g., water transportation, aerial transportation, land transportation, etc.). For example, adaptive logistics platform 230 may receive baseline information and event information for containers that are loaded onto a first transportation means (e.g., a cargo ship at a departure port may take one or more containers to an arrival port). Next, adaptive logistics platform 230 may receive baseline information and event information for the one or more containers when each container is loaded onto a second transportation means (e.g., upon reaching the arrival port, one or more containers may be subsequently transported to a departure airport where a plane may fly the one or more containers to an arrival airport). Next, adaptive logistics platform 230 may receive baseline information and event information for the one or more containers when each container is loaded onto a third transportation means (e.g., upon reaching the arrival airport, certain containers may be subsequently loaded onto trucks for delivery to a suppliers factory). Here, adaptive logistics platform 230 may more accurately determine demurrage and/or detention data by taking tens of thousands of data points (e.g., baseline information and/or event information) into consideration (e.g., by using an artificial intelligence model and/or a natural language processing technique) and using each data point to create an accurate determination of demurrage and/or detention.

As indicated above, FIG. 5 is provided merely as an example. Other examples are possible and may differ from what was described with regard to FIG. 5.

In this way, demurrage and/or detention determinations may be improved by efficient and effective allocation of resources (e.g., computing resources or personnel). For example, a determination of demurrage and/or detention may be made by utilizing a system that conserves network resources by sending less data because the system may request only a portion of baseline information to determine the charges. Furthermore, the system may conserve memory resources by storing baseline information on a separate server. Furthermore, the system may conserve processing resources because baseline information does not have to be retrieved from a local database. Here, overall performance and/or operation of the system may be improved due to the efficient and/or effective allocation of such resources, thereby allowing the system to function more efficiently and/or effectively.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more processors to:
determine a predicted port congestion based on a model that maps movement of shipping vessels,
the predicted port congestion being determined based on global positioning system (GPS) readings indicating the shipping vessels are in motion or at rest outside of a port;
receive geolocation information from a location sensor of a shipping vessel that carries one or more shipping containers,
the geolocation information identifying a location of the shipping vessel,
each shipping container, of the one or more shipping containers, being associated with a GPS sensor;
alter, based on the geolocation information received from the location sensor of the shipping vessel and the predicted port congestion, an amount of computing resources used to monitor periodic GPS measurements reported by the GPS sensor associated with each shipping container,
the amount of computing resources to be altered being determined based on a predicted amount of time the shipping vessel will be motionless;
collect event information using the altered amount of computing resources used to monitor the periodic GPS measurements,
the event information identifying one or more container events associated with the one or more shipping containers,
the one or more container events indicating a time to be used to determine demurrage or detention data for the one or more shipping containers;
determine, based on the event information, baseline information associated with generating demurrage or detention data for the one or more shipping containers;
determine, based on the one or more container events and the baseline information, that demurrage or detention has been triggered in association with the one or more shipping containers;
generate the demurrage or detention data for the one or more shipping containers using the baseline information and the event information, and based on determining that demurrage or detention has been triggered in association with the one or more shipping containers,
the one or more processors, when generating the demurrage or detention data, are to:
generate the demurrage or detention data based on one or more exception events that identify an exception to demurrage or detention,
the one or more exception events including one or more of:
a port congestion delay, or
a customs delay;
provide the demurrage or detention data; and
update the model using the baseline information and the event information.

2. The device of claim 1, where the baseline information identifies a time period for demurrage or detention and an amount to be charged for demurrage or detention; and
where the one or more processors, when generating the demurrage or detention data, are to:
generate the demurrage or detention data based on the time period and the amount to be charged.

3. The device of claim 1, where the one or more processors are to:
receive a document that includes the baseline information; and
parse the document, using natural language processing, to identify the baseline information.

4. The device of claim 1, where a container event, of the one or more container events, is triggered based on the GPS sensor associated with the one or more shipping containers.

5. The device of claim 1, where a container event, of the one or more container events, is triggered based on user input provided to a computing device.

6. The device of claim 1, where the one or more container events indicate at least one of:
a customer pickup of a shipping container of the one or more shipping containers, or
a customer drop-off of the shipping container.

7. A method, comprising:
determining, by a device, a predicted port congestion based on a model that maps movement of shipping vessels,
the predicted port congestion being determined based on global positioning system (GPS) readings indicating the shipping vessels are in motion or at rest outside of a port;
receiving, by the device, geolocation information from a location sensor of a shipping vessel that carries one or more shipping containers,
the geolocation information identifying a location of the shipping vessel,
each shipping container, of the one or more shipping containers, being associated with a GPS sensor;
altering, by the device and based on the location of the geolocation information received from the location sensor of the shipping vessel and the predicted port congestion, an amount of computing resources used to monitor periodic GPS measurements reported by the GPS sensor associated with each shipping container,
the amount of computing resources to be altered being determined based on a predicted amount of time the shipping vessel will be motionless;
collecting, by the device, event information using the altered amount of computing resources used to monitor the periodic GPS measurements;
the event information identifying a container event associated with generating demurrage or detention data for a shipping container;
identifying, by the device and based on the event information, baseline information associated with generating the demurrage or detention data for the shipping container;
determining, by the device and based on the container event and the baseline information, that generation of the demurrage or detention data is to be triggered in association with the shipping container;
generating, by the device, the demurrage or detention data for the shipping container based on the event information and the baseline information, and based on determining that generation of the demurrage or detention data is to be triggered in association with the shipping container,
where generating the demurrage or detention data comprises:
generating the demurrage or detention data based on one or more exception events that identify an exception to demurrage or detention,
the one or more exception events including one or more of:
a port congestion delay, or
a customs delay;
providing, by the device, the demurrage or detention data; and
updating, by the device, the model using the baseline information and the event information.

8. The method of claim 7, where the baseline information identifies a time period for demurrage or detention and an amount to be charged for demurrage or detention; and
where generating the demurrage or detention data comprises:
generating the demurrage or detention data based on the time period and the amount to be charged.

9. The method of claim 7, where the container event is triggered based on the GPS sensor detecting pick up or drop off of the shipping container.

10. The method of claim 7, where the container event is triggered based on user input provided to a computing device.

11. The method of claim 7, where the container event indicates at least one of:
a customer pickup of the shipping container, or
a customer drop-off of the shipping container.

12. The method of claim 7, where the event information includes a customer identifier that identifies a customer associated with the container event; and
where generating the demurrage or detention data comprises:
generating the demurrage or detention data for the customer associated with the container event.

13. The method of claim 12, where identifying the baseline information comprises:

identifying the baseline information based on the customer identifier.

14. A non-transitory computer-readable medium storing instructions, the instructions comprising:
one or more instructions that, when executed by one or more processors, cause the one or more processors to:
determine a predicted port congestion based on a model that maps movement of shipping vessels,
the predicted port congestion being determined based on global positioning system (GPS) readings indicating the shipping vessels are in motion or at rest outside of a port;
receive geolocation information from a location sensor of a shipping vessel that carries one or more shipping containers,
the geolocation information identifying a location of the shipping vessel,
each shipping container, of the one or more shipping containers, being associated with a GPS sensor;
alter, based on the geolocation information received from the location sensor of the shipping vessel and the predicted port congestion, an amount of computing resources used to monitor periodic GPS measurements reported by the GPS sensor associated with each shipping container,
the amount of computing resources to be altered being determined based on a predicted amount of time the shipping vessel will be motionless;
collect event information using the altered amount of computing resources used to monitor the periodic GPS measurements,
the event information identifying a container event associated with generating demurrage or detention data for a shipping container,
the container event indicating a time to be used to generate the demurrage or detention data for the shipping container;
identify, based on the event information, baseline information associated with generating the demurrage or detention data for the shipping container;
determine, based on the event information and the baseline information, that generation of the demurrage or detention data is to be triggered in association with the shipping container;
generate the demurrage or detention data for the shipping container based on the event information and the baseline information, and based on determining that generation of the demurrage or detention data is to be triggered in association with the shipping container,
where the one or more instructions, that cause the one or more processors to generate the demurrage or detention data, cause the one or more processors to:
generate the demurrage or detention data based on one or more exception events that identify an exception to demurrage or detention,
the one or more exception events including one or more of:
a port congestion delay, or
a customs delay;
provide the demurrage or detention data; and
update the model using the baseline information and the event information.

15. The non-transitory computer-readable medium of claim 14, where the event information includes a customer identifier that identifies a customer that picked up or dropped off the shipping container; and where the one or more instructions, that cause the one or more processors to identify the baseline information, cause the one or more processors to:
identify the baseline information based on the customer identifier.

16. The non-transitory computer-readable medium of claim 15, where the one or more instructions, when executed by the one or more processors, cause the one or more processors to:
determine that a transaction, associated with the customer, has been completed; and
where the one or more instructions, that cause the one or more processors to provide the demurrage or detention data, cause the one or more processors to:
provide the demurrage or detention data based on determining that the transaction, associated with the customer, has been completed.

17. The non-transitory computer-readable medium of claim 15, where the one or more instructions, when executed by the one or more processors, cause the one or more processors to:
determine that the customer has subscribed to receive periodic updates regarding the demurrage or detention data; and
where the one or more instructions, that cause the one or more processors to provide the demurrage or detention data, cause the one or more processors to:
provide the demurrage or detention data periodically based on determining that the customer has subscribed to receive periodic updates regarding the demurrage or detention data.

18. The non-transitory computer-readable medium of claim 15, where the container event is triggered based on the GPS sensor detecting pick up or drop off of the shipping container by the customer.

19. The non-transitory computer-readable medium of claim 14, where the one or more instructions, that cause the one or more processors to determine that generation of the demurrage or detention data is to be triggered, cause the one or more processors to:
determine the time indicated in the container event;
determine a time period, included in the baseline information, associated with generating the demurrage or detention data; and
determine that generation of the demurrage or detention data has been triggered based on the time and the time period.

20. The device of claim 1, where the one or more processors, when generating the demurrage or detention data, are to:
generate the demurrage or detention data by crediting time to a buyer or a seller for the one or more of the port congestion delay or the customs delay.

* * * * *